(12) United States Patent
Kasai (10) Patent No.: US 10,578,131 B2
(45) Date of Patent: Mar. 3, 2020

(54) MASTER CYLINDER AND MANUFACTURING METHOD THEREFOR

(71) Applicant: Hitachi Automotive Systems, Ltd., Ibaraki (JP)

(72) Inventor: Shinya Kasai, Minami-Alps (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 10 days.

(21) Appl. No.: 15/580,705

(22) PCT Filed: Jun. 30, 2016

(86) PCT No.: PCT/JP2016/069461
§ 371 (c)(1),
(2) Date: Dec. 8, 2017

(87) PCT Pub. No.: WO2017/010302
PCT Pub. Date: Jan. 19, 2017

(65) Prior Publication Data
US 2018/0187701 A1  Jul. 5, 2018

(30) Foreign Application Priority Data

Jul. 16, 2015 (JP) ................................ 2015-142008

(51) Int. Cl.
*F15B 7/08* (2006.01)
*B60T 11/16* (2006.01)
(Continued)

(52) U.S. Cl.
CPC ................ *F15B 7/08* (2013.01); *B60T 11/16* (2013.01); *B60T 13/143* (2013.01);
(Continued)

(58) Field of Classification Search
CPC .. F15B 7/08; B60T 11/20; B60T 11/16; B60T 13/143; F16B 37/0005; F16B 37/005; F16B 39/02
See application file for complete search history.

(56) References Cited

U.S. PATENT DOCUMENTS 6,012,288 A * 1/2000 Gualdoni ................ B60T 11/16
 29/888.06
6,935,110 B2 * 8/2005 Anderson ............... B60T 11/20
 60/562

FOREIGN PATENT DOCUMENTS

JP 63-195959 U 12/1988
JP 03-094368 U 9/1991
(Continued)

OTHER PUBLICATIONS

International Search Report of PCT/JP2016/069461 dated Aug. 9, 2016.

Primary Examiner — Abiy Teka
(74) Attorney, Agent, or Firm — Mattingly & Malur, PC (57) ABSTRACT

A spring retainer includes a locking member which locks one end side of the piston spring, and a rod-shaped member (82) of which one end is in contact with the locking member to restrict a length of the piston spring and the other end is fixed to the piston (11), and the rod-shaped member (82) is installed in a concave portion (140) of the piston (11), and the concave portion (140) has a protruding portion (142), which is extruded by plastic deformation toward a radial direction of the concave portion (140) and is formed of the same member as the opening circumferential edge portion (141), in the vicinity of the opening circumferential edge portion (141).

16 Claims, 6 Drawing Sheets

(51) Int. Cl.
*F16B 37/00* (2006.01)
*F16B 39/02* (2006.01)
*B60T 13/14* (2006.01)
*F16B 25/00* (2006.01)

(52) U.S. Cl.
CPC ............ *F16B 37/005* (2013.01); *F16B 39/02* (2013.01); *F16B 25/0021* (2013.01)

(56) References Cited

FOREIGN PATENT DOCUMENTS

| | | |
|---|---|---|
| JP | 05-012345 U | 2/1993 |
| JP | 08-192732 A | 7/1996 |
| JP | 11-217071 A | 8/1999 |
| JP | 2005-526645 A | 9/2005 |
| WO | 03/053757 A1 | 7/2003 |

\* cited by examiner

MASTER CYLINDER AND MANUFACTURING METHOD THEREFOR

TECHNICAL FIELD

The present invention relates to a master cylinder for supplying a hydraulic pressure to a braking cylinder of a vehicle and a manufacturing method therefor.

Priority is claimed on Japanese Patent Application No. 2015-142008, filed Jul. 16, 2015, the content of which is incorporated herein by reference.

BACKGROUND ART

In a master cylinder, a spring retainer which restricts a return spring for a piston is installed at the piston with a rod-shaped member (refer to, for example, Patent Document 1).

CITATION LIST

Patent Literature

[Patent Document 1]
Japanese Unexamined Patent Application, First Publication No. H11-217071

SUMMARY OF INVENTION

Technical Problem

In the case in which a spring retainer is installed at a piston with a rod-shaped member, it is necessary prevent loosening of the rod-shaped member, which may increase cost.

Accordingly, the present invention provides a master cylinder which is capable of limiting an increase in cost and a manufacturing method therefor.

Solution to Problem

In a master cylinder according to one aspect of the present invention, a spring retainer includes a locking member configured to lock one end side of the piston spring, and a rod-shaped member of which one end side is in contact with the locking member to restrict the length of the piston spring and the other end side is fixed to the piston. The rod-shaped member is installed in a concave portion provided to open at a central portion of the piston, and the concave portion has a protruding portion configured to protrude toward a radial center of the concave portion.

Further, in a method of manufacturing a master cylinder according to one aspect, a rod-shaped member is installed in a concave portion of the piston, and the method includes a step of extruding a member near an opening circumferential edge portion of the concave portion by plastic deformation toward a radial center of the concave portion.

Advantageous Effects of Invention

According to the above-described master cylinder, it is possible to limit an increase in cost.

DESCRIPTION OF EMBODIMENTS

Figure 1:
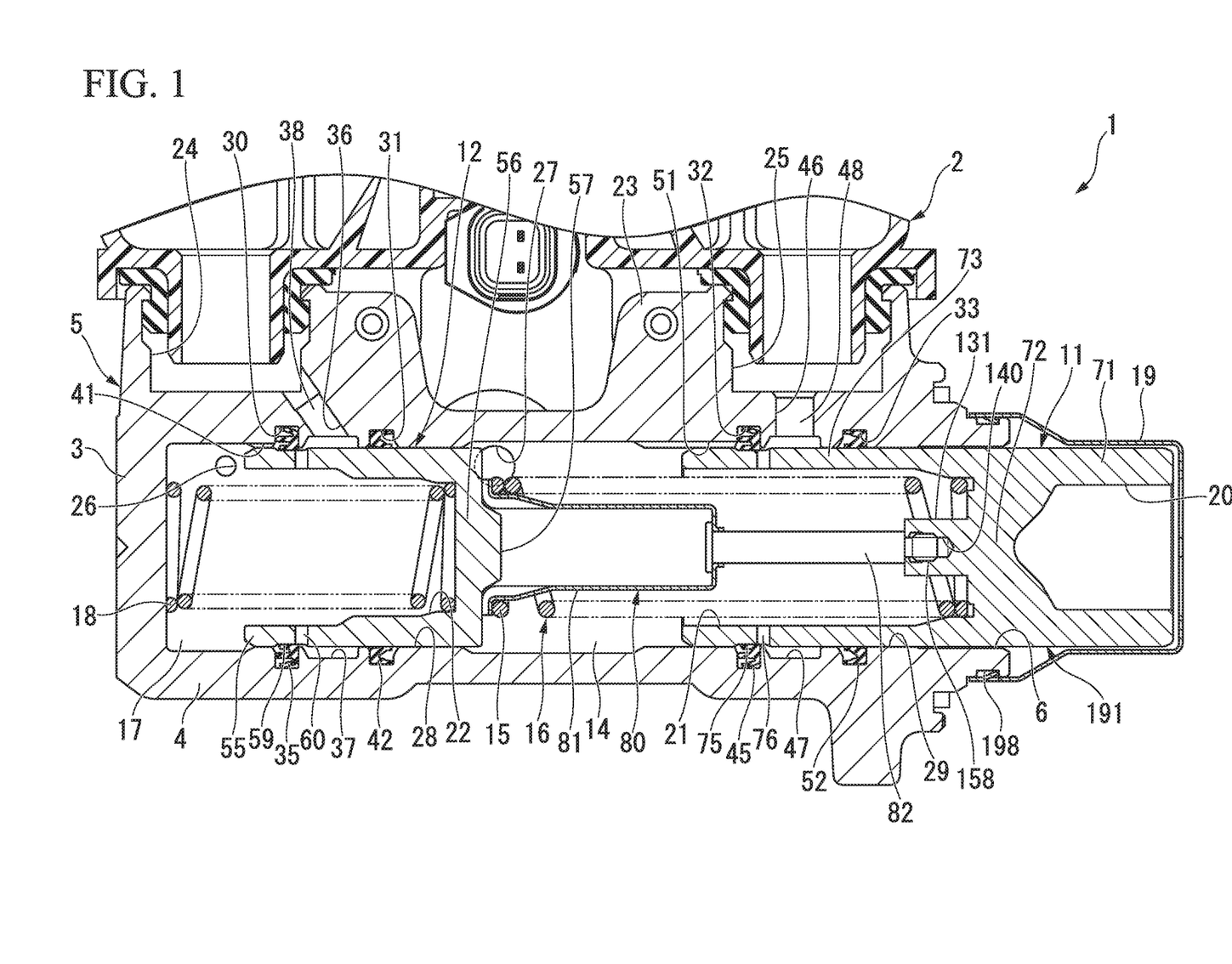
FIG. 1 is a cross-sectional view showing a master cylinder.

One embodiment will be described with reference to the drawings. In a master cylinder 1 of the embodiment shown in FIG. 1, a force corresponding to an operation amount of a brake pedal (not shown) is introduced via an output shaft of a brake booster (not shown), and a brake fluid pressure corresponding to the operation amount of the brake pedal is generated. A reservoir 2 (only a part of which is shown in FIG. 1) for supplying and discharging a brake fluid is installed at an upper side of the master cylinder 1 in a vertical direction. Further, in the embodiment, although the reservoir 2 is directly installed at the master cylinder 1, a reservoir may be disposed at a position away from the master cylinder 1, and the reservoir and the master cylinder 1 may be connected by a piping.

The master cylinder 1 has a metal cylinder body 5 which has a cylinder bottom portion 3 and a cylinder tube portion 4 and is formed by machining a single material in a bottomed cylindrical shape. On a cylinder opening 6 side in the cylinder body 5, a primary piston 11 (piston) formed of a metallic material is movably disposed to partially protrude from the cylinder body 5. Further, in the same way, a secondary piston 12 formed of a metallic material is movably disposed on a cylinder bottom portion 3 side of the primary piston 11 in the cylinder body 5.

A primary pressure chamber 14 is defined between the primary piston 11 and the secondary piston 12 in the cylinder body 5. Between the primary piston 11 and the secondary piston 12, an interval adjusting portion 16 including a primary piston spring 15 (piston spring) which determines an interval therebetween in a non-braking state in which there is no input from the output shaft of the brake booster (not shown) is provided. A secondary pressure chamber 17 is defined between the secondary piston 12 and the cylinder bottom portion 3 in the cylinder body 5. Between the secondary piston 12 and the cylinder bottom portion 3, a secondary piston spring 18 which determines an interval therebetween in the non-braking state in which there is no input from the output shaft of the brake booster (not shown) is provided. A stopper member 19 which restricts separation of the primary piston 11 from the cylinder body 5 is installed at an outside of the cylinder opening 6 of the cylinder body 5.

In the primary piston 11, a first inner circumferential hole 20 and a second inner circumferential hole 21 each having a bottom surface are formed on both axial sides. An inner circumferential hole 22 having a bottom surface is formed in the secondary piston 12. The master cylinder 1 is a so-called plunger type. Further, the master cylinder 1 is a tandem type master cylinder having the two pistons, the primary piston 11 and the secondary piston 12, as described above. Also, the present invention is not limited to an application to the tandem type master cylinder and can be applied to any plunger type master cylinder such as a single type master cylinder having one piston arranged in the cylinder body and a master cylinder having three or more pistons as long as it is a plunger type master cylinder.

In the cylinder body 5, an installing base portion 23 which protrudes outward in a radial direction of the cylinder tube portion 4 (hereinafter referred to as a cylinder radial direction) is formed integrally at a predetermined position in a circumferential direction of the cylinder tube portion 4 (hereinafter referred to as a cylinder circumferential direction). An installation hole 24 and an installation hole 25 for installing the reservoir 2 are formed in the installing base portion 23. Further, in the embodiment, the installation hole 24 and the installation hole 25 are formed at an upper side in the vertical direction so that positions thereof in a direction of an axial line (hereinafter referred to as a cylinder axis) of the cylinder tube portion 4 of the cylinder body 5 are shifted in a state in which positions thereof in the cylinder circumferential direction coincide with each other. The cylinder body 5 is disposed in the vehicle in a posture in which a cylinder axial direction is aligned with a forward and backward direction of a vehicle.

On an installing base portion 23 side of the cylinder tube portion 4, a secondary discharge passage 26 is formed near the cylinder bottom portion 3. In addition, a primary discharge passage 27 is formed on the cylinder opening 6 side of the secondary discharge passage 26. Although not shown in the drawings, the secondary discharge passage 26 and the primary discharge passage 27 communicate with a brake cylinder such as a disk brake or a drum brake via a brake piping and discharge the brake fluid in the secondary pressure chamber 17 and the primary pressure chamber 14 toward the brake cylinder. Further, in the embodiment, the secondary discharge passage 26 and the primary discharge passage 27 are formed so that positions thereof in the cylinder axial direction are shifted in a state in which positions thereof in the cylinder circumferential direction coincide with each other.

A sliding inner diameter portion 28 protruding inward in the cylinder radial direction and having an annular shape in the cylinder circumferential direction is formed on an inner circumferential portion of the cylinder tube portion 4 on the cylinder bottom portion 3 side. The secondary piston 12 is slidably fitted to a smallest inner diameter surface of the sliding inner diameter portion 28, is guided by the inner diameter surface, and moves in the cylinder axial direction. A sliding inner diameter portion 29 protruding inward in the cylinder radial direction and having an annular shape in the cylinder circumferential direction is formed on an inner circumferential portion of the cylinder tube portion 4 on the cylinder opening 6 side of the sliding inner diameter portion 28. The primary piston 11 is slidably fitted to a smallest inner diameter surface of the sliding inner diameter portion 29, is guided by the inner diameter surface, and moves in the cylinder axial direction.

In the sliding inner diameter portion 28, a plurality of grooves (here, two) including a circumferential groove 30 and a circumferential groove 31, both of which are formed in an annular shape, are formed, in turn, from the cylinder bottom portion 3 side in a state in which positions thereof in the cylinder axial direction are shifted. Also, in the sliding inner diameter portion 29, a plurality of grooves (here, two) including a circumferential groove 32 and a circumferential groove 33, both of which are formed in an annular shape, are formed, in turn, from the cylinder bottom portion 3 side in a state in which positions thereof in the cylinder axial direction are shifted. The circumferential grooves 30 and 31 are annularly formed in the cylinder circumferential direction and have a shape which is recessed outward in the cylinder radial direction further than the smallest inner diameter surface of the sliding inner diameter portion 28, and the circumferential grooves 32 and 33 are annularly formed in the cylinder circumferential direction and have a shape which is recessed outward in the cylinder radial direction further than the smallest inner diameter surface of the sliding inner diameter portion 29. All of the circumferential grooves 30 to 33 are formed by machining as a whole.

The circumferential groove 30 closest to the cylinder bottom portion 3 side among the circumferential grooves 30 to 33 is formed in the vicinity of the installation hole 24 of the installation hole 24 and the installation hole 25 on the cylinder bottom portion 3 side. An annular piston seal 35 is disposed in the circumferential groove 30 to be held in the circumferential groove 30.

On the cylinder opening 6 side of the circumferential groove 30 in the sliding inner diameter portion 28 of the cylinder body 5, an annular opening groove 37 recessed more than the minimum inner diameter surface of the sliding inner diameter portion 28 is formed outside in the cylinder radial direction. The opening groove 37 opens a communication hole 36 bored from the installation hole 24 on the cylinder bottom portion 3 side into the cylinder tube portion 4. Here, the opening groove 37 and the communication hole 36 constitute a secondary supply passage 38 which is provided in the cylinder body 5 and is always in communication with the reservoir 2.

On the cylinder bottom portion 3 side of the circumferential groove 30 in the sliding inner diameter portion 28 of the cylinder body 5, a communication groove 41 which opens into the circumferential groove 30 and linearly extends from the circumferential groove 30 toward the cylinder bottom portion 3 side in the cylinder axial direction is formed to be recessed outward in the cylinder radial direction more than the smallest inner diameter surface of the sliding inner diameter portion 28. The communication groove 41 allows the secondary discharge passage 26 formed at a position between the cylinder bottom portion 3 and the circumferential groove 30 in the vicinity of the cylinder bottom portion 3 to be in communication with the circumferential groove 30 via the secondary pressure chamber 17 between the secondary piston 12 and the cylinder bottom portion 3.

In the sliding inner diameter portion 28 of the cylinder body 5, the circumferential groove 31 is formed on a side of the opening groove 37 opposite to the circumferential groove 30 in the cylinder axial direction, that is, on the cylinder opening 6 side. In the circumferential groove 31, an annular partition seal 42 is disposed to be held in the circumferential groove 31.

The circumferential groove 32 is formed near the installation hole 25 on the cylinder opening 6 side in the sliding inner diameter portion 29 of the cylinder body 5. An annular piston seal 45 is disposed in the circumferential groove 32 to be held in the circumferential groove 32.

On the cylinder opening 6 side of the circumferential groove 32 in the sliding inner diameter portion 29 of the cylinder body 5, an annular opening groove 47 which is recessed outward in the cylinder radial direction from the smallest inner diameter surface of the sliding inner diameter portion 29 is formed. The opening groove 47 opens a communication hole 46 bored from the installation hole 25 on the cylinder opening 6 side into the cylinder tube portion 4. Here, the opening groove 47 and the communication hole 46 mainly constitute a primary supply passage 48 which is provided in the cylinder body 5 and is always in communication with the reservoir 2.

On the cylinder bottom portion 3 side of the circumferential groove 32 in the sliding inner diameter portion 29 of the cylinder body 5, a communication groove 51 which opens into the circumferential groove 32 and linearly extends from the circumferential groove 32 toward the cylinder bottom portion 3 side in the cylinder axial direction is formed to be recessed outward in the cylinder radial direction more than the minimum inner diameter surface of the sliding inner diameter portion 29. The communication groove 51 allows the primary discharge passage 27 formed at a position between the circumferential groove 31 and the circumferential groove 32 in the vicinity of the circumferential groove 31 to be in communication with the circumferential groove 32 via the primary pressure chamber 14 between the primary piston 11 and the secondary piston 12.

In the sliding inner diameter portion 29 of the cylinder body 5, the circumferential groove 33 is formed on a side of the opening groove 47 opposite to the circumferential groove 32, that is, on the cylinder opening 6 side. In the circumferential groove 33, an annular partition seal 52 is disposed to be held in the circumferential groove 33.

The secondary piston 12 disposed on the cylinder bottom portion 3 side of the cylinder body 5 is formed to have a cylindrical portion 55, a bottom portion 56 formed on one side of the cylindrical portion 55 in an axial direction, and a stepped portion 57 protruding from the bottom portion 56 toward a side opposite to the cylindrical portion 55. The inner circumferential hole 22 is formed by the cylindrical portion 55 and the bottom portion 56. The secondary piston 12 is fitted in each of the sliding inner diameter portion 28 of the cylinder body 5 and the piston seal 35 and the partition seal 42 provided in the sliding inner diameter portion 28 in a state in which the cylindrical portion 55 is disposed on the cylinder bottom portion 3 side of the cylinder body 5. The secondary piston 12 slides in the cylinder body 5 while being guided thereby.

An annular outer circumferential concave portion 59 which is recessed inward in the radial direction further than a largest outer diameter surface in an outer circumferential surface of the secondary piston 12 is formed in an outer circumferential portion of the cylindrical portion 55 on an end side thereof opposite to the bottom portion 56. In the outer circumferential concave portion 59, a plurality of ports 60 which penetrate in the cylinder radial direction on the bottom portion 56 side are formed to be radially arranged at regular intervals in the cylinder circumferential direction.

The above-described secondary piston spring 18 which is a coil spring is inserted into the inner circumferential hole 22 of the secondary piston 12. One end of the secondary piston spring 18 in the axial direction is in contact with the bottom portion 56 of the secondary piston 12, and the other end thereof in the axial direction is in contact with the cylinder bottom portion 3 of the cylinder body 5. The secondary piston spring 18 determines the distance between the secondary piston 12 and the cylinder bottom portion 3 in the non-braking state in which there is no input from the output shaft of the brake booster (not shown). When there is an input from the output shaft of the brake booster (not shown), the secondary piston spring 18 contracts and biases the secondary piston 12 toward the cylinder opening 6 side according to the contraction.

A portion formed to be surrounded by the cylinder bottom portion 3, a portion of the cylinder tube portion 4 on the cylinder bottom portion 3 side and the secondary piston 12 is the above-mentioned secondary pressure chamber 17 which generates the brake fluid pressure and supplies the brake fluid pressure to the secondary discharge passage 26. In other words, the secondary piston 12 forms the secondary pressure chamber 17 for supplying a fluid pressure to the secondary discharge passage 26 between the secondary piston 12 and the cylinder body 5. The secondary pressure chamber 17 is in communication with the secondary supply passage 38, that is, the reservoir 2, when the secondary piston 12 is in a position to open the ports 60 in the opening groove 37.

The partition seal 42 held in the circumferential groove 31 of the cylinder body 5 is an integrally molded product formed of a synthetic rubber and has a C shape on one side thereof in a radial cross section including a center line thereof. The partition seal 42 is disposed in the circumferential groove 31 in a state in which a lip portion thereof faces the cylinder opening 6 side. An inner circumference of the partition seal 42 is in sliding contact with the outer circumferential surface of the secondary piston 12 which moves in the cylinder axial direction, and an outer circumference thereof is in contact with the circumferential groove 31 of the cylinder body 5. Accordingly, the partition seal 42 always seals a gap between positions of the partition seal 42 of the cylinder body 5 and the secondary piston 12.

The piston seal 35 held in the circumferential groove 30 of the cylinder body 5 is an integrally molded product formed of a synthetic rubber such as EPDM and has an E shape on one side thereof in a radial cross section including a center line thereof. The piston seal 35 is disposed in the circumferential groove 30 in a state in which a lip portion thereof faces the cylinder bottom portion 3 side. An inner circumference of the piston seal 35 is in sliding contact with the outer circumferential surface of the secondary piston 12 which moves in the cylinder axial direction. Further, an outer circumference of the piston seal 35 is in contact with the circumferential groove 30 of the cylinder body 5.

When there is no input from the output shaft of the brake booster (not shown) and the secondary piston 12 is in a basic position (non-braking position) for opening the port 60 in the opening groove 37 as shown in FIG. 1, the piston seal 35 is located in the outer circumferential concave portion 59 of the secondary piston 12 and partly wraps around the ports 60 in the cylinder axis direction. In this state, the secondary pressure chamber 17 is in communication with the reservoir 2 via the secondary supply passage 38 and the ports 60.

When the primary piston 11 moves toward the cylinder bottom portion 3 side due to an output of the brake booster (not shown), the secondary piston 12 moves toward the cylinder bottom portion 3 side when the primary piston 11 is pressed through the interval adjusting portion 16 including the primary piston spring 15. At this time, the secondary piston 12 slides and moves on inner circumferences of the piston seal 35 and the partition seal 42 held by the sliding inner diameter portion 28 of the cylinder body 5 and the cylinder body 5. When the secondary piston 12 moves toward the cylinder bottom portion 3 side, the secondary piston 12 is brought into a state in which the ports 60 are located closer to the cylinder bottom portion 3 side than the piston seal 35. In this state, the piston seal 35 seals a space among the reservoir 2, the secondary supply passage 38 and the secondary pressure chamber 17. As a result, when the secondary piston 12 further moves toward the cylinder bottom portion 3 side, the brake fluid in the secondary pressure chamber 17 is pressurized. The brake fluid pressurized in the secondary pressure chamber 17 is supplied to the braking cylinder on a wheel side from the secondary discharge passage 26.

Meanwhile, when the output of the brake booster (not shown) becomes smaller in a state in which the brake fluid in the secondary pressure chamber 17 is pressurized, the secondary piston 12 is returned to the cylinder opening 6 side by a biasing force of the secondary piston spring 18. As the secondary piston 12 moves, the capacity of the secondary pressure chamber 17 expands, but at this time, if return of the brake fluid via the brake piping cannot catch up with the expansion of the capacity of the secondary pressure chamber 17, the fluid pressure of the secondary supply passage 38 which is atmospheric pressure and the liquid pressure of the secondary pressure chamber 17 become equal to each other, and then the liquid pressure in the secondary pressure chamber 17 becomes a negative pressure.

Then, the negative pressure in the secondary pressure chamber 17 deforms the piston seal 35, and a gap between the piston seal 35 and the circumferential groove 30 is formed. Therefore, the brake fluid in the secondary supply passage 38 passes through the gap and is supplied to the secondary pressure chamber 17. Thus, the speed at which the fluid pressure in the secondary pressure chamber 17 is returned from the negative pressure state to the atmospheric pressure is increased.

The primary piston 11 disposed on the cylinder opening 6 side of the cylinder body 5 has a shape including a base end side cylindrical portion 71 on a base end side which is the output shaft side of the brake booster (not shown), a bottom portion 72 formed on one side of the base end side cylindrical portion 71 in the axial direction, and a distal end side cylindrical portion 73 formed on a side of the bottom portion 72 opposite to the base end side cylindrical portion 71. The first inner circumferential hole 20 is formed by the base end side cylindrical portion 71 and the bottom portion 72 among them, and the second inner circumferential hole 21 is formed by the distal end side cylindrical portion 73 and the bottom portion 72 among them.

The primary piston 11 is fitted to each of the sliding inner diameter portion 29 of the cylinder body 5 and the piston seal 45 and the partition seal 52 provided in the sliding inner diameter portion 29 in a state in which the distal end side cylindrical portion 73 is disposed on the secondary piston 12 side. The primary piston 11 slides in the cylinder body 5 while being guided by them. The output shaft of the brake booster (not shown) is inserted into the base end side cylindrical portion 71, that is, into the first inner circumferential hole 20, the bottom portion 72 is pressed by this output shaft, and the primary piston 11 moves forward toward the cylinder bottom portion 3 side.

An annular outer circumferential concave portion 75 which is recessed inward in the radial direction further than an outer diameter surface having a maximum diameter on an outer circumferential surface of the primary piston 11 is formed in an end side circumferential portion of the distal end side cylindrical portion 73 opposite to the bottom portion 72. In the outer circumferential concave portion 75, a plurality of ports 76 which penetrate in the radial direction on the bottom portion 72 side are formed to be radially arranged at regular intervals in the cylinder circumferential direction.

The above-mentioned interval adjusting portion 16 for determining the interval therebetween in the non-braking state in which there is no input from the output shaft of the brake booster (not shown) is provided on the secondary piston 12 side of the primary piston 11. The interval adjusting portion 16 is constituted with the primary piston spring 15 and a spring retainer 80 which restricts a maximum length of the primary piston spring 15. The spring retainer 80 includes a seat 81 which is a locking member for locking an end side of the primary piston spring 15 close to the cylinder bottom portion 3, and a stem 82 which is a rod-shaped member of which one end side close to the cylinder bottom portion 3 is in contact with the seat 81 and the other end side close to the cylinder opening 6 is screwed and fixed to the primary piston 11. An end of the primary piston spring 15 close to the cylinder opening 6 is in contact with the bottom portion 72 of the primary piston 11, and an end thereof close to the cylinder bottom portion 3 is in contact with the seat 81, and the primary piston spring 15 is interposed between the seat 81 and the bottom portion 72 of the primary piston 11. The primary piston 11 has the first and second inner circumferential holes 20 and 21 at both axial ends thereof, and the spring retainer 80 is fixed to the second inner circumferential hole 21 on the distal end side thereof. In the interval adjusting portion 16, the seat 81 is in contact with the bottom portion 56 of the secondary piston 12. At that time, the seat 81 engages with the stepped portion 57 of the secondary piston 12 thereinside.

The stem 82 slidably supports the seat 81 while restricting a movement range of the seat 81 in the axial direction. That is, the stem 82 restricts the movement of the seat 81 over a predetermined range with respect to the stem 82 and the primary piston 11 to which the stem 82 is fixed. As a result, the stem 82 restricts elongation of the primary piston spring 15 engaged with the seat 81 so that the maximum length thereof does not exceed a predetermined length. The primary piston spring 15 contracts when there is an input from the output shaft of the brake booster (not shown) and the interval between the primary piston 11 and the secondary piston 12 becomes narrow and biases the primary piston 11 toward the output shaft side of the brake booster (not shown) according to the contraction.

Here, a portion formed to be surrounded by the cylinder tube portion 4 of the cylinder body 5, the primary piston 11 and the secondary piston 12 is the above-mentioned primary pressure chamber 14 which generates the brake fluid pressure and supplies the brake fluid to the primary discharge passage 27. In other words, the primary piston 11 forms the primary pressure chamber 14 for supplying the fluid pressure to the primary discharge passage 27 between the secondary piston 12 and the cylinder body 5. As shown in FIG. 1, the primary pressure chamber 14 is in communication with the primary supply passage 48, that is, the reservoir 2, when the primary piston 11 is in a position to open the ports 76 in the opening groove 47.

The partition seal 52 held in the circumferential groove 33 of the cylinder body 5 is a common component to the partition seal 42, is an integrally molded product formed of a synthetic rubber, and has a C shape on one side thereof in a radial cross section including a center line thereof. The partition seal 52 is disposed in the circumferential groove 33 in a state in which a lip portion thereof faces the cylinder bottom portion 3 side. An inner circumference of the partition seal 45 is in sliding contact with the outer circumferential surface of the primary piston 11 which moves in the cylinder axial direction, and an outer circumference thereof is in contact with the circumferential groove 33 of the cylinder body 5. Accordingly, the partition seal 52 always seals a gap between positions of the primary piston 11 and the partition seal 52 of the cylinder body 5.

The piston seal 45 held in the circumferential groove 32 of the cylinder body 5 is a common component to the piston seal 35, is an integrally molded product formed of a synthetic rubber such as EPDM, and has an E shape on one side thereof in a radial cross section including a center line thereof. The piston seal 45 is disposed in the circumferential groove 32 in a state in which a lip portion thereof faces the cylinder bottom portion 3 side. An inner circumference of the piston seal 45 is in sliding contact with the outer circumferential surface of the primary piston 11 which moves in the cylinder axial direction. An outer circumference of the piston seal 45 is in contact with the circumferential groove 32 of the cylinder body 5.

When there is no input from the output shaft of the brake booster (not shown) and the primary piston 11 is in the basic position (non-braking position) for opening the port 76 in the opening groove 47 as shown in FIG. 1, the piston seal 45 is located in the outer circumferential concave portion 75 of the primary piston 11 and partly wraps around the ports 76 in the cylinder axis direction. In this state, the primary pressure chamber 14 is in communication with the reservoir 2 via the primary supply passage 48 and the ports 76.

The primary piston 11 moves toward the cylinder bottom portion 3 side due to the output of the brake booster (not shown). At this time, the primary piston 11 slides and moves on inner circumferences of the piston seal 45 and the partition seal 52 held by the sliding inner diameter portion 29 of the cylinder body 5 and the cylinder body 5. When the primary piston 11 moves toward the cylinder bottom portion 3 side, the primary piston 11 is brought into a state in which the ports 76 are located closer to the cylinder bottom portion 3 side than the piston seal 45. In this state, the piston seal 45 seals a space among the reservoir 2, the primary supply passage 48 and the primary pressure chamber 14. As a result, when the primary piston 11 further moves toward the cylinder bottom portion 3 side, the brake fluid in the primary pressure chamber 14 is pressurized. The brake fluid pressurized in the primary pressure chamber 14 is supplied to the braking cylinder on the wheel side from the primary discharge passage 27.

Meanwhile, when the output of the brake booster (not shown) becomes smaller in a state in which the brake fluid in the primary pressure chamber 14 is pressurized, the primary piston 11 is attempted to be returned to a side opposite to the cylinder bottom portion 3 by a biasing force of the primary piston spring 15. As the primary piston 11 moves, a capacity of the primary pressure chamber 14 expands, but at this time, if the return of the brake fluid via the brake piping cannot catch up with the expansion of the capacity of the primary pressure chamber 14, the fluid pressure of the primary supply passage 48 which is atmospheric pressure and the liquid pressure of the primary pressure chamber 14 become equal to each other, and then the liquid pressure in the primary pressure chamber 14 becomes a negative pressure.

Then, the negative pressure in the primary pressure chamber 14 deforms the piston seal 45, and a gap between the piston seal 45 and the circumferential groove 32 is formed. Therefore, the brake fluid in the primary supply passage 48 passes through the gap and is supplied to the primary pressure chamber 14. Thus, a speed at which the fluid pressure in the primary pressure chamber 14 is returned from the negative pressure state to the atmospheric pressure is increased.

Figure 2:
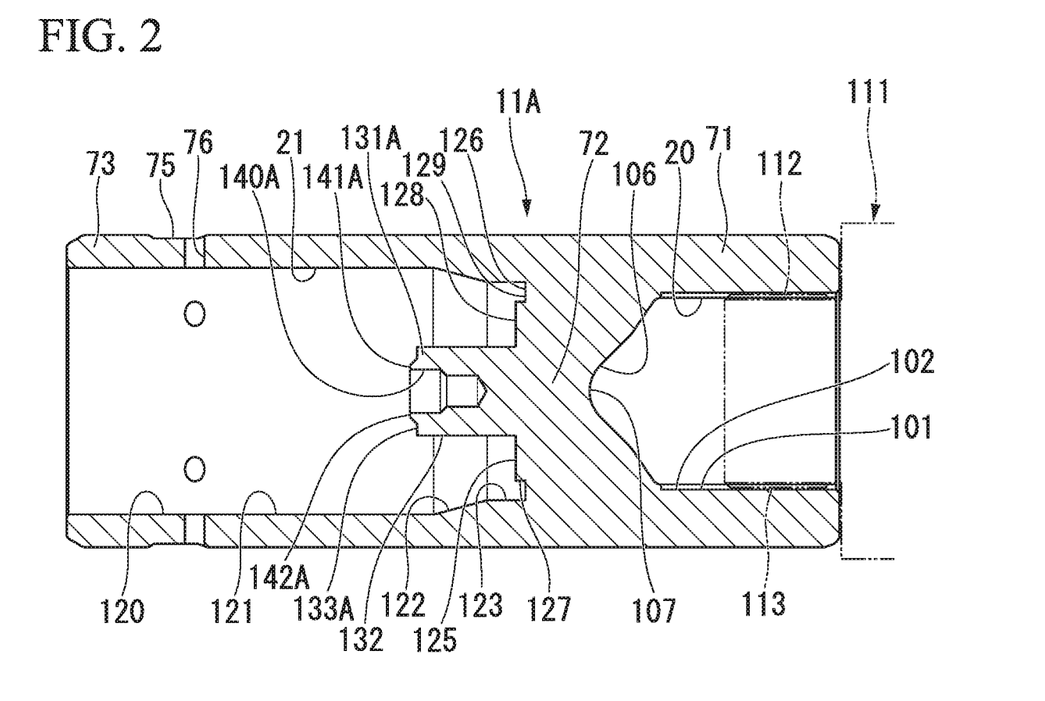
FIG. 2 is a cross-sectional view showing a primary piston of the master cylinder before a stem installing process.

FIG. 2 shows a primary piston 11A before the interval adjusting portion 16 shown in FIG. 1 is installed. Further, the same reference numerals are given to portions which are not changed in the primary piston 11A before the interval adjusting portion 16 is installed and the primary piston 11 after the interval adjuster 16 is installed, and in portions which are changed, "A" is added to the reference numerals of the state before the change to distinguish them.

Figure 3:
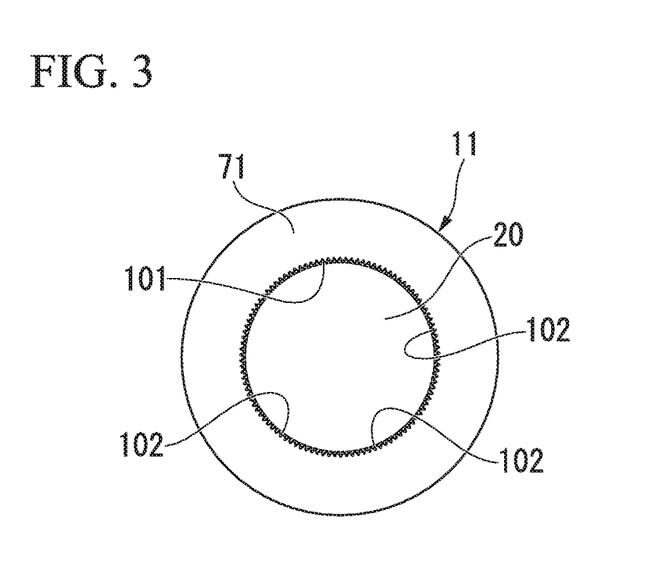
FIG. 3 is a front view showing a primary piston of the master cylinder.

As shown in FIG. 2, a fitting portion 101 having a flat portion to which a jig 111 for limiting rotation of the primary piston 11A is fitted is formed in the first inner circumferential hole 20 on a base end side of the primary piston 11A. As shown in FIG. 3, the fitting portion 101 has a plurality of fitting grooves 102 formed in an inner circumferential portion of the base end side cylindrical portion 71. The plurality of fitting grooves 102 have the same shapes, extend in two linear planes in an axial direction of the primary piston 11A and are arranged at regular intervals in a circumferential direction of the primary piston 11A. That is, the fitting portion 101 has a serration shape. In addition, among the two planes of the fitting groove 102, the plane on one side constitutes the above-described flat portion to which the jig 111 is fitted. Further, it is sufficient that the fitting portion 101 can be fitted with the jig to limit the rotation of the primary piston 11. For example, two parallel planes facing each other may be formed in an inner circumferential surface of the base end side cylindrical portion 71, that is, in the first inner circumferential hole 20, and two parallel planes opposite to each other may also be formed on the jig so that the jig and the first inner circumferential hole 20 are engaged with each other.

As shown in FIG. 2, a spline shaft portion 112 is formed at the jig 111. A plurality of convex portions 113 are formed on the spline shaft portion 112. The convex portions 113 have the same shape, extend linearly in an axial direction of the spline shaft portion 112 and are arranged at regular intervals in a circumferential direction of the spline shaft portion 112. The jig 111 is used while being fixed to a workbench or the like. In the jig 111, when the spline shaft portion 112 is fitted into the fitting portion 101 of the primary piston 11A, each of the convex portions 113 is engaged with each of the fitting grooves 102, and the relative rotation of the primary piston 11A is limited.

On the base end side cylindrical portion 71 side of the bottom portion 72 forming a bottom surface of the first inner circumferential hole 20 in the axial direction, a concave portion 106 having a concave shape of which a center thereof in the radial direction is located on the distal end side in the axial direction is formed. The concave portion 106 is formed so that a center position thereof in the radial direction is a deepest portion 107 which is most recessed. A distal end of the output shaft of the brake booster (not shown) is in contact with the deepest portion 107 of the bottom portion 72.

An inner circumferential surface 120 of the distal end side cylindrical portion 73 of the primary piston 11A, in other words, the inner circumferential surface 120 of the second inner circumferential hole 21 has a cylindrical surface portion 121, a tapered surface portion 122, and a cylindrical surface portion 123, in turn, from a side opposite to the bottom portion 72, that is, from the distal end side. The cylindrical surface portion 121 is formed to have a cylindrical surface shape having a constant diameter. The tapered surface portion 122 is formed to be extend in a tapered surface shape having a smaller diameter as it is located from an end edge of the cylindrical surface portion 121 on the bottom portion 72 side toward the bottom portion 72 side.

The cylindrical surface portion 123 is formed in a cylindrical surface shape having a constant diameter from an end edge of the tapered surface portion 122 on the bottom portion 72 side and extends toward the bottom portion 72 side. The cylindrical surface portion 121, the tapered surface portion 122 and the cylindrical surface portion 123 have the same central axis.

A bottom surface 125 of the bottom portion 72 of the primary piston 11A on the distal end side cylindrical portion 73 side, in other words, the bottom surface 125 of the second inner circumferential hole 21 has an annular surface portion 126, a cylindrical surface portion 127 and an annular surface portion 128. The annular surface portion 126 has an annular shape and extends radially inward from an end edge of the cylindrical surface portion 123 on a side opposite to the tapered surface portion 122 to be orthogonal to the cylindrical surface portion 123. The cylindrical surface portion 127 is formed in a cylindrical surface shape which extends from an inner circumferential edge of the annular surface portion 126 toward the cylindrical surface portion 121 side. The annular surface portion 128 has an annular shape and extends radially inwardly from an end edge of the cylindrical surface portion 127 on a side opposite to the annular surface portion 126 to be orthogonal to the cylindrical surface portion 127. The cylindrical surface portion 123, the annular surface portion 126, the cylindrical surface portion 127 and the annular surface portion 128 have the same central axis. In the second inner circumferential hole 21, an annular concave portion 129 which is recessed toward the base end side cylindrical portion 71 side of the annular surface portion 128 is formed in the bottom portion 72 by the cylindrical surface portion 123, the annular surface portion 126 and the cylindrical surface portion 127.

A columnar installing portion 131A which protrudes from a radial center of the bottom portion 72 toward the same side as the distal end side cylindrical portion 73, that is, toward a distal end side is formed in the second inner circumferential hole 21 of the primary piston 11A. The installing portion 131A has an outer circumferential surface 132 and a distal end surface 133A on the distal end side thereof. The outer circumferential surface 132 is formed in a cylindrical surface shape which extends from an inner circumferential edge of the annular surface portion 128 in a direction opposite to the bottom portion 72. The distal end surface 133A 131A includes an annular outer surface portion 135 shown in FIG. 4 which extends radially inwardly from an end edge of the outer circumferential surface 132 on a side opposite to the bottom portion 72, a tapered surface portion 136A which extends radially inward from the inner circumferential edge of the outer surface portion 135 in a diameter-reduced manner to be inwardly away from the outer surface portion 135 in the axial direction, and an annular inner surface portion 137A which extends radially inward from an inner circumferential edge of the tapered surface portion 136A in parallel with the outer surface portion 135. As shown in FIG. 2, the outer circumferential surface 132 and the distal end surface 133A have the same central axis as the annular surface portion 128.

At a radial center of the installing portion 131A, a concave portion 140A is formed to a predetermined depth to be recessed in the axial direction from the distal end surface 133A without penetrating the primary piston 11A in the axial direction. In other words, the concave portion 140A is formed to open into the second inner circumferential hole 21 but not to open in the first inner circumferential hole 20. That is, the installing portion 131A has a bottomed cylindrical shape. The concave portion 140A of the installing portion 131A is a portion at which the stem 82 (rod-shaped member) of the interval adjusting portion 16 shown in FIG. 1 is installed.

Figure 4:
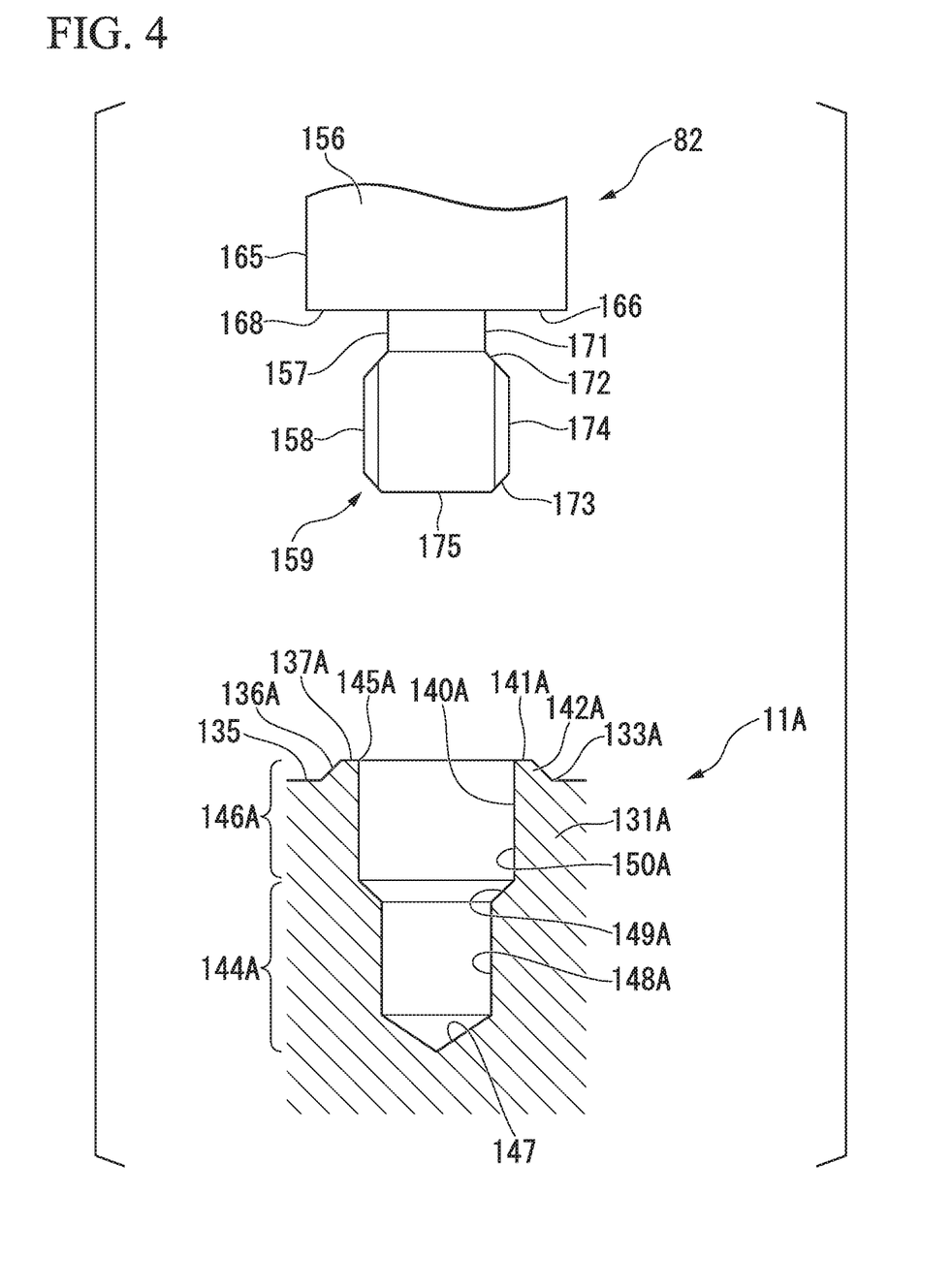
FIG. 4 is an exploded view showing a joining portion between a stem and the primary piston of the master cylinder before the stem installing process.

As shown in FIG. 4, the concave portion 140A is formed inside the inner surface portion 137A. An opening circumferential edge portion 141A which is a circumferential edge portion of an opening portion 145A of the concave portion 140A has the entire inner surface portion 137A, the entire tapered surface portion 136A and a part of an inner circumferential side of the outer surface portion 135. A portion including the entire inner surface portion 137A and the entire tapered surface portion 136A is a convex portion 142A which protrudes in a direction away from the bottom portion 72 shown in FIG. 2 further than the outer surface portion 135. Therefore, the primary piston 11A has the convex portion 142A in which the opening circumferential edge portion 141A of the concave portion 140A protrudes in a direction opposite to the bottom portion 72. In other words, the opening circumferential edge portion 141A has the convex portion 142A which protrudes in a direction in which the primary piston spring 15 shown in FIG. 1 is disposed before the stem 82 is installed in the concave portion 140A. The convex portion 142A has a tapered shape in which an outer diameter thereof becomes smaller toward a protruding distal end side. As shown in FIG. 2, the entire primary piston 11A, that is, the base end side cylindrical portion 71, the bottom portion 72, the distal end side cylindrical portion 73, and the installing portion 131A including the convex portion 142A are formed by machining one material.

As shown in FIG. 4, a predetermined area of the concave portion 140A on an inner side in a depth direction is a first area 144A, and a predetermined area thereof on an opening portion 145A side is a second area 146A. The first area 144A and the second area 146A are adjacent. The first area 144A includes a conical surface-shaped bottom surface 147 which has a smaller diameter as it goes away from the opening portion 145A, a cylindrical surface-shaped inner circumferential surface 148A which extends from an end edge of the bottom surface 147 on the opening portion 145A side toward the opening portion 145A, and a tapered surface-shaped inclined surface 149A which extends toward the opening portion 145A side while expanding in diameter from an end edge of the inner circumferential surface 148A on the opening portion 145A side. The second area 146A includes a cylindrical surface-shaped inner circumferential surface 150A which extends from an end edge of the inclined surface 149A on the opening portion 145A side toward the opening portion 145A. The bottom surface 147, the inner circumferential surface 148A, the inclined surface 149A, and the inner circumferential surface 150A are formed coaxially with each other with central axes thereof being aligned and are formed on a central axis of the installing portion 131A, that is, on a central axis of the primary piston 11A. The inner circumferential surface 150A extends to an opening end of the opening portion 145A. An inner diameter of the inner circumferential surface 148A of the first area 144A is smaller than an inner diameter of the inner circumferential surface 150A of the second area 146A. That is, the concave portion 140A is a two-stage stepped hole of which an inner side is narrow.

Figure 5:
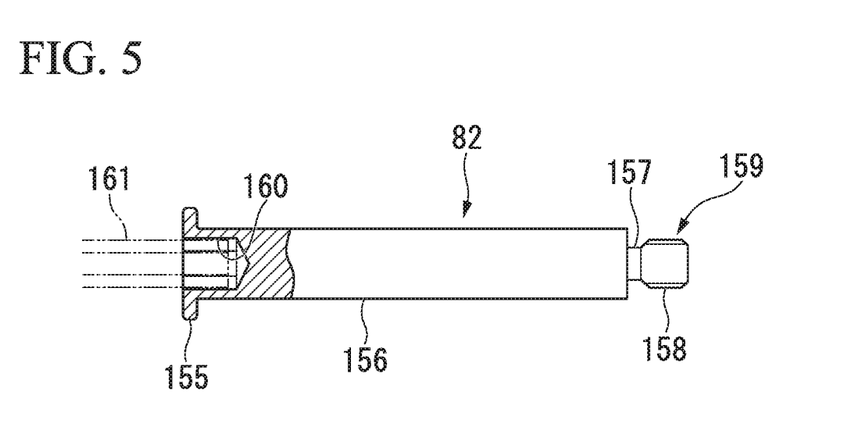
FIG. 5 is a side view showing a cross section of a part of the stem of the master cylinder.

As shown in FIG. 5, the stem 82 has a disc-shaped large-diameter portion 155, a columnar rod-shaped portion 156 having a diameter smaller than that of the large-diameter portion 155, an annular recess portion 157 which is recessed in the radial direction to have a diameter smaller than that of the rod-shaped portion 156, and a screw portion 158, in turn, from one end side thereof in the axial direction. That is, the large-diameter portion 155 is formed on one end side of the stem 82 in the axial direction, and an extension portion 159 extending from an end surface of the rod-shaped portion 156 is formed on the other end side in the axial direction. The screw portion 158 is provided at a distal end (end opposite to the large-diameter portion 155) of the extension portion 159, and the annular recess portion 157 is provided in the extension portion 159 on the large-diameter portion 155 side of the screw portion 158, that is, on one end side in the axial direction. In the stem 82, the rod-shaped portion 156 is formed on the large-diameter portion 155 side of the annular recess portion 157, that is, one end side in the axial direction. The large-diameter portion 155, the rod-shaped portion 156, the extension portion 159, the annular recess portion 157 and the screw portion 158 have the same central axis. The stem 82 is formed by machining one material.

Figure 6:
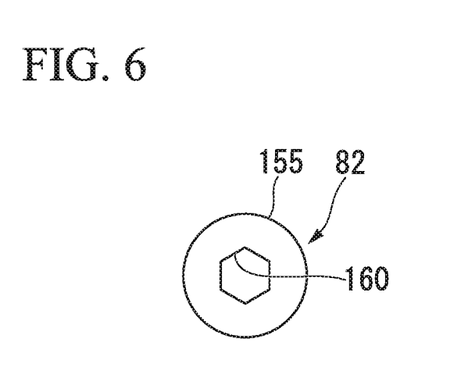
FIG. 6 is a front view showing the stem of the master cylinder.

A polygonal hole 160 into which a tool 161 for rotating the stem 82 is inserted is provided at an inside of the large-diameter portion 155 of the stem 82, that is, an end surface thereof on one end side in the axial direction. Specifically, the tool 161 is a hexagonal wrench, and thus the polygonal hole 160 is a hole having a regular hexagonal shape when seen from a front as shown in FIG. 6.

As shown in FIG. 4, the rod-shaped portion 156 has an outer circumferential surface 165 which has a constant diameter cylindrical surface and an end surface 166 which extends radially inward from an end edge of the outer circumferential surface 165 on the screw portion 158 side. The end surface 166 is orthogonal to a central axis of the outer circumferential surface 165, that is, a central axis of the stem 82. A stepped tip side end portion 168 including the end surface 166 and a part of the outer circumferential surface 165 one the end surface 166 side is formed on the screw portion 158 side of the rod-shaped portion 156. The maximum outer diameter of the end surface 166, that is, a maximum outer diameter of the tip side end portion 168 is formed larger than a maximum outer diameter of the tapered surface portion 136A which is a maximum outer diameter of the convex portion 142A.

The annular recess portion 157 is formed by the above-described end surface 166, a cylindrical surface portion 171 on the screw portion 158 side of the end surface 166, and a chamfered edge 172 on the rod-shaped portion 156 side of the screw portion 158. The cylindrical surface portion 171 is formed in a cylindrical surface shape having a constant diameter and extends from an inner circumferential edge portion of the end surface 166 toward the screw portion 158. The chamfered edge 172 is formed to extend axially from an end edge of the cylindrical surface portion 171 on a side opposite to the end surface 166 in an enlarged diameter state in which a diameter thereof is increased in a direction away from the end surface 166. A chamfered edge 173 is also formed on an outer circumferential side of an end of the screw portion 158 on a side opposite to the rod-shaped portion 156, and the chamfered edge 173 is formed so that the diameter thereof is reduced in a direction away from the end surface 166 in the axial direction. An outer circumference of the screw portion 158 between the chamfered edges 172 and 173 is a spiral apex portion 174 of a screw thread, and the spiral apex portion 174 is located on a cylindrical surface. A distal end surface 175 of the screw portion 158 on a side opposite to the rod-shaped portion 156 is formed in a circular shape. The outer circumferential surface 165, the end surface 166, the cylindrical surface portion 171, the chamfered edges 172 and 173, the spiral apex portion 174 and the distal end surface 175 have the same central axis.

The screw portion 158 is a self-tapping screw which is screwed while forming a female thread in an object to be installed. In the screw portion 158, a diameter of the spiral apex portion 174 which is the maximum outer diameter thereof is smaller than the inner diameter of the inner circumferential surface 150A of the second area 146A of the installing portion 131A of the primary piston 11A to be installed. Further, in the screw portion 158, the diameter of the spiral apex portion 174 is smaller than an inner diameter of the inner circumferential surface 148A of the first area 144A of the installing portion 131A of the primary piston 11A.

Figure 7A:
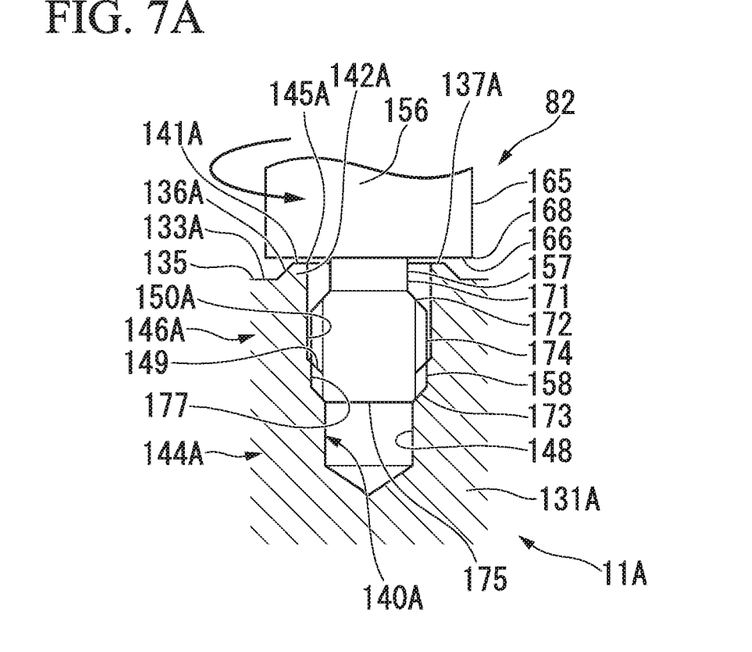
FIG. 7A is a cross-sectional view showing the joining portion between the stem and the primary piston of the master cylinder in the middle of the stem installing process.

When the interval adjusting portion 16 shown in FIG. 1 is installed at the primary piston 11A shown in FIG. 2, the stem 82 of the interval adjusting portion 16 is installed in the concave portion 140A of the installing portion 131A of the primary piston 11A. At this time, as shown in FIG. 4, since the inner diameter of the inner circumferential surface 150A of the second area 146A of the concave portion 140A is larger than an outer diameter of the spiral apex portion 174 of the screw portion 158 of the stem 82, the screw portion 158 can be inserted into an inside of the inner circumferential surface 150A of the second area 146A without being in contact with the inner circumferential surface 150A. Additionally, the tool 161 is fitted into the polygonal hole 160 of the stem 82 shown in FIG. 5 in a state in which the chamfered edge 173 of the screw portion 158 is in contact with the inclined surface 149A of the first area 144A, and the stem 82 is rotated by this tool 161 while being pushed into the concave portion 140A. Accordingly, as shown in FIG. 7A, the screw portion 158 which is the self-tapping screw is screwed while forming a female screw 177 in the first area 144A of the concave portion 140A.

Additionally, when the screwing of the screw portion 158 into the first area 144A is performed, the end surface 166 of the rod-shaped portion 156 comes into contact with the inner surface portion 137A of the convex portion 142A. That is, the end surface 166 of the rod-shaped portion 156 comes into contact with the convex portion 142A provided in the opening circumferential edge portion 141A before the screwing of the screw portion 158 into the concave portion 140A. When the stem 82 is further rotated by the tool 161, the tip side end portion 168 including the end surface 166 of the rod-shaped portion 156 of the stem 82 plastically deforms the convex portion 142A to extrude it toward an inside of the concave portion 140A due to an inclination on the outer diameter side thereof.

Figure 7B:
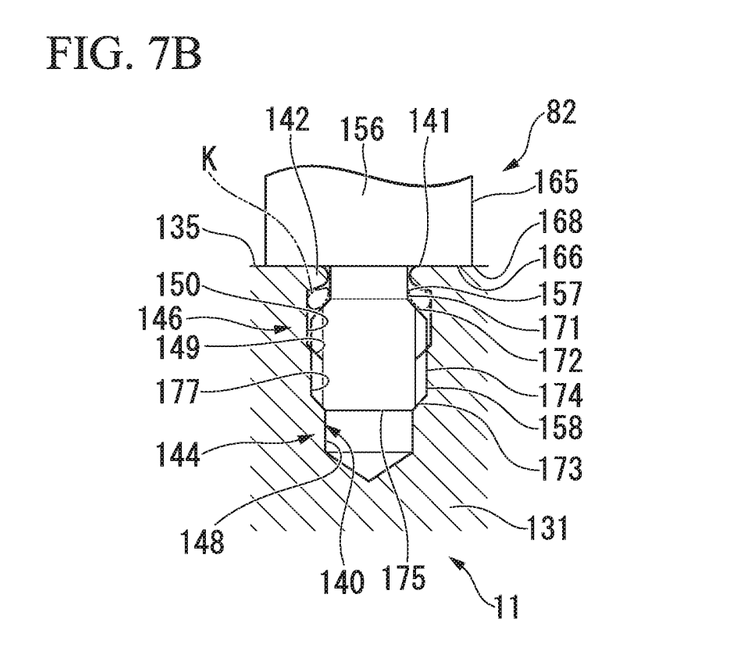
FIG. 7B is a cross-sectional view showing the joining portion between the stem and the primary piston of the master cylinder after the stem installing process.

When the screw portion 158 is screwed into the first area 144A by a predetermined amount, the concave portion 140 is formed in the installing portion 131 as shown in FIG. 7B. In the concave portion 140, a protruding portion 142 which is extruded by the plastic deformation of the convex portion 142A toward a radial center of the concave portion 140A is formed in the vicinity of the opening circumferential edge portion 141. The protruding portion 142 is formed of the same member as the opening circumferential edge portion 141. In this manner, a stem installing process in which the stem 82 is installed at the primary piston 11 is completed. That is, the concave portion 140 protrudes toward the inside of the concave portion 140, that is, toward the radial center in the vicinity of the opening circumferential edge portion 141 and has the protruding portion 142 formed of the same member as the opening circumferential edge portion 141.

After the stem installing process is completed, the female screw 177 and the protruding portion 142 are formed in the concave portion 140. Further, the female screw 177 may be formed in advance in the first area 144 before the stem installing process without using the self-tapping screw as the screw portion 158.

The female screw 177 is formed in the first area 144 including the inner circumferential surface 148 and the inclined surface 149 after the completion of the stem installing process. Further, the second area 146 after the completion of the stem installing process is a portion which remains between the protruding portion 142 including the inner circumferential surface 150 and the inclined surface 149. After the stem installing process is completed, the opening circumferential edge portion 141 of the concave portion 140 is aligned with the outer surface portion 135 in height. The protruding portion 142 is formed between the second area 146 and the opening circumferential edge portion 141 after the completion of the stem installing process. An entire circumference of the opening circumferential edge portion 141 after the completion of the stem installing process is in close contact with the end surface 166 of the tip side end portion 168.

The protruding portion 142 after the completion of the stem installing process, that is, after the plastic deformation has an annular shape, and an inner diameter thereof is smaller than an outer diameter of the screw portion 158 of the stem 82, that is, an outer diameter of the spiral apex portion 174. Therefore, the protruding portion 142 limits loosening of the stem 82 with respect to the primary piston 11. Here, a volume of the convex portion 142A allows cutting chips K generated by the self-tapping of the screw portion 158 to be accommodated in a gap between the protruding portion 142 and the screw portion 158. Further, by the cutting chips K interposed therebetween, it is set to limit the screw portion 158 from moving toward the protruding portion 142 side. Furthermore, when the female screw 177 is formed in advance in the first area 144 before the stem installing process, since there is no generation of the cutting chips K, the volume of the convex portion 142A can be set so that the protruding portion 142 comes into direct contact with the screw portion 158 by performing the stem installing process and restricts the movement of the screw portion 158 toward the protruding portion 142 side.

After the completion of the stem installing process, the concave portion 140 has the first region 144 having the female screw 177 which is screwed with the screw portion 158. Further, the concave portion 140 after the completion of the stem installing process has the second area 146 which is in a direction away from the distal end surface 175 on the distal end side of the stem 82 of the first region 144 and in which the inner circumferential surface 150 has a gap between the inner circumferential surface 150 and the spiral apex portion 174 which is an outer circumferential portion of the screw portion 158 of the stem 82. In addition, the concave portion 140 after the completion of the stem installing process has the protruding portion 142 formed of the same member as the opening circumferential edge portion 141 between the second region 146 and the opening circumferential edge portion 141 of the concave portion 140.

Figure 8:
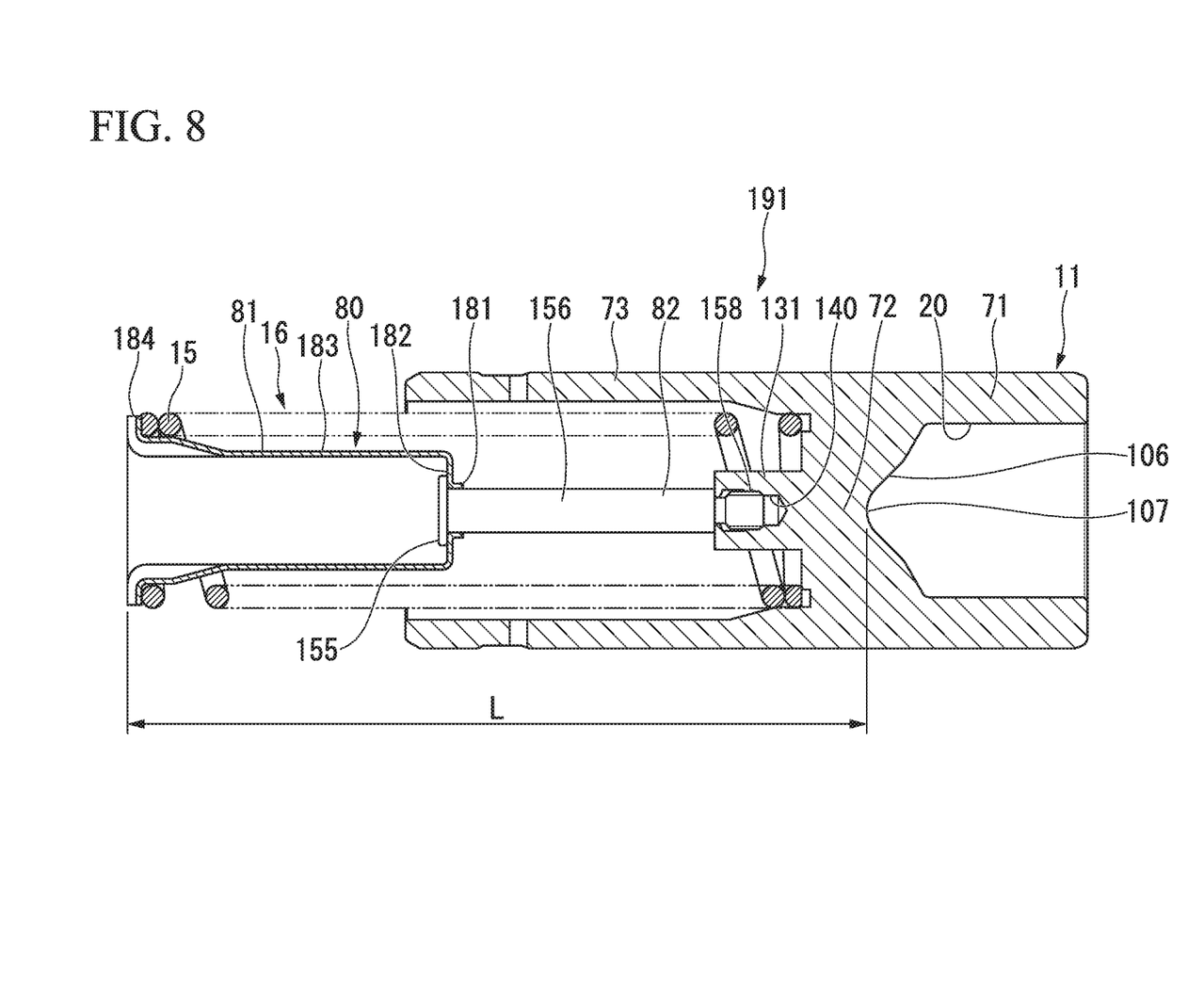
FIG. 8 is a cross-sectional view showing a piston assembly of the master cylinder.

As shown in FIG. 8, the seat 81 has a cylindrical fitting port portion 181, an annular contact portion 182 which extends radially outward from an end edge of the fitting port portion 181 on one end side in the axial direction to be orthogonal to the fitting port portion 181, a cylindrical body portion 183 which extends from an outer circumferential edge of the contact portion 182 toward a side opposite to the fitting port portion 181 in the axial direction, and an annular locking portion 184 which extends radially outward from an end edge of the body portion 183 on a side opposite to the contact portion 182 to be orthogonal to the body portion 183.

In the seat 81, the stem 82 is inserted into the body portion 183 and the fitting port portion 181 from the locking portion 184 side with the screw portion 158 at the head. At this time, the rod-shaped portion 156 of the stem 82 is slidably fitted in the fitting port portion 181. Further, the stem 82 is restricted from passing through the fitting port portion 181 by the large-diameter portion 155 being in contact with the contact portion 182.

In a state in which the seat 81 and the stem 82 are assembled as described above and constitute the spring retainer 80, the primary piston spring 15 is interposed between the locking portion 184 of the seat 81 and the bottom portion 72 of the primary piston 11. Additionally, while the primary piston spring 15 is contracted from a natural state by the seat 81 of which the contact portion 182 is in contact with the large-diameter portion 155 of the stem 82, the screw portion 158 of the stem 82 is screwed into the concave portion 140 of the primary piston 11 by the above-described stem installing process.

At this time, the spline shaft portion 112 of the jig 111 is fitted to the fitting portion 101 of the primary piston 11 shown in FIG. 2 to limit the rotation of the primary piston 11, and the screw portion 158 of the stem 82 is screwed into the concave portion 140 of the primary piston 11 by rotating the tool 161 fitted into the polygonal hole 160 of the stem 82 shown in FIG. 5. Therefore, as shown in FIG. 8, the interval adjusting portion 16 constituted with the spring retainer 80 which has the seat 81 and the stem 82, and the primary piston spring 15 is assembled to the primary piston 11 to be a piston assembly 191.

The primary piston 11 and the interval adjusting portion 16 are assembled to the cylinder body 5 shown in FIG. 1 in a state of the piston assembly 191 assembled in advance as described above. That is, in a state in which the piston seal 35 is installed in the circumferential groove 30 of the cylinder body 5 and the partition seal 42 is installed in the circumferential groove 31, the secondary piston spring 18 and the secondary piston 12 are inserted into the cylinder body 5 in this order, and the secondary piston 12 is fitted to the piston seal 35 and the section seal 42. Then, the piston seal 45 is installed at the circumferential groove 32 of the cylinder body 5, the partition seal 52 is installed at the circumferential groove 33, the piston assembly 191 is inserted into the cylinder body 5, and the primary piston 11 is fitted to the piston seal 45 and the partition seal 52. Additionally, the stopper member 19 is engaged with the locking groove 198 of the cylinder body 5 on the cylinder opening 6 side to cover the primary piston 11.

In the piston assembly 191 shown in FIG. 8, the contact portion 182 of the seat 81 is in contact with the large-diameter portion 155 of the stem 82 fixed to the primary piston 11, and the movement in the direction away from the primary piston 11 in the axial direction is restricted. In this state, the primary piston spring 15 is in a state of being contracted more than the natural state.

When the stem 82 is assembled to the primary piston 11A as described above, in the stem installing process described above, the stem 82 is screwed into the primary piston 11A until a length from the primary piston 11 to an end of the primary piston spring 15 on the seat 81 side becomes a predetermined length, Specifically, in the installing process, as shown in FIG. 8, the stem 82 is screwed into the primary piston 11A so that a distance L from the deepest portion 107 of the concave portion 106 on the base end side of the primary piston 11 which is in contact with the output shaft of the brake booster (not shown) to an end of the seat 81 on a side opposite to the primary piston 11 is a predetermined distance. In other words, the tip side end portion 168 of the rod-shaped portion 156 is disposed in the concave portion 140 of the primary piston 11 until the length from the primary piston 11 to the end of the primary piston spring 15 on the seat 81 side reaches a predetermined length by the stem installing process. In other words, in the assembling process of the piston assembly 191, an assembling amount of the stem 82 is managed so that the length from the primary piston 11 to the end of the primary piston spring 15 on the seat 81 side becomes a predetermined length. Therefore, one end side of the stem 82 comes into contact with the seat 81 and restricts the length of the primary piston spring 15.

The stem 82 of the spring retainer 80 is screwed so that the length from the primary piston 11 to the end of the primary piston spring 15 on the seat 81 side becomes the predetermined length and is in a specified installation state.

As described above, since the primary piston 11A is plastically deformed into the primary piston 11, the stem 82 is formed of a material harder than the primary piston 11A. For example, the stem 82 is formed of a steel material, and the primary piston 11A is formed of an aluminum alloy casting or forging, or an iron casting or forging.

In the master cylinder disclosed in Patent Document 1, a retainer is screwed directly to a piston and installed thereat, and a return spring is disposed therebetween. Therefore, the number of components can be reduced, and the cost can be reduced. However, in a structure in which the retainer is screwed, it is necessary to take a measure to prevent loosening. That is, when the screwing loosens, since the maximum length of the piston spring becomes longer, the secondary piston moves forward, and a piston communication port through which the brake fluid flows between the supply chamber and the pressure chamber is kept closed by a cup, and the fluid pressure in the pressure chamber cannot be released, and thus brake dragging may occur. Accordingly, for example, it is necessary to apply an anti-loosening agent to a screwed portion or to add a washer to prevent the loosening. As a result, the cost increases. Further, after the retainer screwed, air may be present in a screw hole for screwing the retainer. If the screwed engagement of the retainer loosens, the air may flow out during use, pedal feeling may be deteriorated. In addition, when the self-tapping screw is used to prevent the loosening, so-called contamination in which the cutting chips are mixed in the brake fluid may occur.

In this regard, also in the master cylinder 1 of the embodiment, since the other end side of the stem 82 of the spring retainer 80 which restricts the length of the primary piston spring 15 by one end side thereof being in contact with the seat 81 is fixed to the primary piston 11, the number of components is reduced, and thus the cost can be reduced. Further, since the number of components of the spring retainer 80 decreases, accumulation of errors affecting the maximum length of the primary piston spring 15 to be restricted is reduced, the error of the maximum length can be limited. Therefore, variations in an ineffective stroke of a brake pedal and variations in characteristics of the master cylinder 1 can be limited.

Further, the master cylinder 1 of the embodiment has the protruding portion 142, which is formed of the same member as the opening circumferential edge portion 141 and extruded by the plastic deformation toward an inside of the concave portion 140, that is, the radial center, in the vicinity of the opening circumferential edge portion 141 of the concave portion 140 at which the stem 82 is installed. Therefore, since the loosening of the stem 82 can be limited by the protruding portion 142, an increase in the cost can be limited. Since the stem 82 is prevented from loosening, it is possible to limit an outflow of the air remaining in the concave portion 140 and to limit the deterioration of the pedal feeling. In addition, since the protruding portion 142 is plastically deformed toward the inside of the concave portion 140, that is, the radial center, the radial gap with the stem 82 can be reduced. Therefore, even when the self-tapping screw is used as the screw portion 158, an exit of the cutting chips is narrowed, and thus occurrence of the so-called contamination in which the stem 82 is mixed in the brake fluid can be limited.

Further, the opening circumferential edge portion 141A of the concave portion 140A before the installing of the stem 82 has the protruding portion 142A which protrudes toward the primary piston spring 15, and the protruding portion 142 is formed by the convex portion 142A being extruded by the plastic deformation toward the inside of the concave portion 140A. Therefore, the protruding portion 142A can be plastically deformed toward the inside of the concave portion 140A, that is, the radial center by the stem 82, and thus the increase in the cost can be further limited. In addition, since the protruding portion 142 can be formed by performing the process in which the screw portion 158 of the stem 82 is screwed into the concave portion 140A, additional processes or additional members are not necessary, and an increase in the cost can be further limited.

Further, since the concave portion 140 of the primary piston 11 has the first area 144 which is screwed with the screw portion 158 of the stem 82, and the second area 146 which is in the direction away from the distal end side of the stem 82 of the first region 144 and in which the inner circumferential surface 150 has the gap between the inner circumferential surface 150 and the spiral apex portion 174 which is the outer circumferential portion of the stem 82, and the protruding portion 142 is located between the second area 146 and the opening circumferential edge portion 141, the protruding portion 142 can be easily formed by the plastic deformation.

As the master cylinder based on the above-described embodiment, the following embodiments are conceivable. As a first aspect, in a master cylinder which includes a piston which slides in a cylinder body, a piston spring which biases the piston, and a spring retainer which restricts a maximum length of the piston spring, the spring retainer includes a locking member which locks one end side of the piston spring, and a rod-shaped member of which one end is in contact with the locking member to restrict a length of the piston spring and the other end is fixed to the piston, and the rod-shaped member is installed in a concave portion provided to open at a central portion of the piston, and the concave portion has a protruding portion which protrudes toward a radial center of the concave portion.

According to the master cylinder of the first aspect, loosening of the rod-shaped member can be limited while an increase in cost is limited.

As a second aspect, in the first aspect, the concave portion has a first area screwed with a screw portion of the rod-shaped member, and a second area which is positioned farther from a distal end side of the rod-shaped member than the first region and of which an inner circumferential surface has a gap between the inner circumferential surface and an outer circumferential portion of the rod-shaped member, and the protruding portion is provided in an opening portion of the second area.

According to the master cylinder of the second aspect, the protruding portion can be formed by plastic deformation.

As a third aspect, in the first or second aspect, the piston has a first inner circumferential hole and a second inner circumferential hole both having bottom surfaces on both axial sides of the piston, and the first inner circumferential hole has the bottom surface with which an output shaft of a brake booster is in contact, and an installing portion at which the rod-shaped member is installed is provided in the second inner circumferential hole, and the concave portion is provided in the installing portion, and the protruding portion is formed of the same member as the installing portion.

As a fourth aspect, in the third aspect, a flat portion into which a jig for limiting rotation of the piston is fitted is provided on an inner circumferential surface of the first inner circumferential hole.

As a fifth aspect, in any one of the first to third aspects, the rod-shaped member has a large-diameter portion provided at one end side of the rod-shaped member in an axial direction to restrict a position of the locking member and a screw portion provided on the other end side in the axial direction and screwed into the concave portion, and a polygonal hole is open inside the large-diameter portion.

As a sixth aspect, in the fifth aspect, the protruding portion has an inner diameter smaller than an outer diameter of the screw portion of the rod-shaped member.

As a seventh aspect, in the fifth aspect, the rod-shaped member has a rod-shaped portion which is provided at a central portion of the rod-shaped member in an axial direction and has an outer diameter larger than an outer diameter of the screw portion, an extension portion which extends from an end surface of the rod-shaped portion on the other end side and has a distal end serving as the screw portion, and an annular recess portion which is provided in the extension portion between the screw portion and the end surface of the rod-shaped portion, and the protruding portion is in contact with the end surface of the rod-shaped portion.

As an eighth aspect, in a method of manufacturing a master cylinder, the rod-shaped member is installed in the concave portion of the piston, and the method includes a step of extruding a member near an opening circumferential edge portion of the concave portion by plastic deformation toward the radial center of the concave portion.

As a ninth aspect, the opening circumferential edge portion has a convex portion which protrudes toward the piston spring before the rod-shaped member is installed in the concave portion, and the step is a step of plastically deforming the convex portion toward a radial center of the concave portion.

INDUSTRIAL APPLICABILITY

According to the above-described master cylinder, an increase in cost can be limited.

REFERENCE SIGNS LIST

1 Master cylinder
5 Cylinder body
11 Primary piston (piston)
15 Primary piston spring (piston spring)
80 Spring retainer
81 Seat (locking member)
82 Stem (rod-shaped member)
101 Fitting portion
111 Jig
140, 140A Concave portion
141, 141A Opening circumferential edge portion
142 Protruding portion
142A Convex portion
144 First area
146 Second area
150 Inner circumferential surface
158 Screw portion

The invention claimed is:

1. A master cylinder comprising:
a piston configured to slide in a cylinder body;
a piston spring configured to bias the piston; and
a spring retainer configured to restrict a maximum length of the piston spring,
wherein the spring retainer includes a locking member configured to lock one end side of the piston spring, and a rod-shaped member of which one end side is in contact with the locking member to restrict a length of the piston spring and the other end side is fixed to the piston,
wherein the rod-shaped member is installed in a concave portion provided to open at a central portion of the piston,
wherein the concave portion has a protruding portion configured to protrude toward a radial center of the concave portion,
wherein the concave portion has a first area screwed with a screw portion of the rod-shaped member, and a second area which is positioned farther from a distal end side of the rod-shaped member than the first area and of which an inner diameter of an inner circumferential surface is greater than an outer diameter of an outer circumferential portion of the screw portion of the rod-shaped member,
wherein the protruding portion is provided in an opening portion of the second area,
wherein the rod-shaped member has a rod-shaped portion provided at a central portion of the rod-shaped member in the axial direction and having an outer diameter larger than the outer diameter of the screw portion,
wherein an opening circumferential edge portion of the opening portion has a convex portion configured to protrude toward the piston spring before the rod-shaped member is screwed into the concave portion,
wherein the protruding portion is a plastically deformed portion of the convex portion that extends toward the radial center of the concave portion when the screw portion of the rod-shaped member is screwed into the concave portion, and
wherein the rod-shaped portion has an end surface which faces the opening portion and has a maximum outer diameter larger than a maximum outer diameter of the convex portion.

2. The master cylinder according to claim 1,
wherein the piston has a first inner circumferential hole and a second inner circumferential hole both having bottom surfaces on both axial sides of the piston,
wherein the first inner circumferential hole has the bottom surface with which an output shaft of a brake booster is in contact,
wherein an installing portion at which the rod-shaped member is installed is provided in the second inner circumferential hole,
wherein the concave portion is provided in the installing portion, and
wherein the protruding portion is formed of the same member as the installing portion.

3. The master cylinder according to claim 2, wherein a flat portion into which a jig configured to limit rotation of the piston is fitted is provided on an inner circumferential surface of the first inner circumferential hole.

4. The master cylinder according to claim 1,
wherein the rod-shaped member has a large-diameter portion provided at one end side of the rod-shaped member in an axial direction to restrict a position of the locking member and the screw portion provided on the other end side in the axial direction and screwed into the concave portion, and
wherein a polygonal hole is open inside the large-diameter portion.

5. The master cylinder according to claim 4, wherein the protruding portion has an inner diameter smaller than an outer diameter of the screw portion of the rod-shaped member.

6. The master cylinder according to claim 1,
wherein the rod-shaped member has an extension portion configured to extend from an end surface of the rod-shaped portion on the other end side and having a distal end serving as the screw portion, and an annular recess portion provided in the extension portion between the screw portion and the end surface of the rod-shaped portion, and
wherein the protruding portion is in contact with the end surface of the rod-shaped portion.

7. The method according to claim 1,
wherein the end surface of the rod-shaped member engages the concave portion when the screw portion of the rod-shaped member is screwed into the concave portion so that plastic deformation of the convex portion occurs and the protruding portion becomes the plastically deformed portion of the convex portion that extends toward the radial center of the concave portion.

8. A master cylinder comprising:
a piston configured to slide in a cylinder body;
a piston spring configured to bias the piston; and
a spring retainer configured to restrict a maximum length of the piston spring,
wherein the spring retainer includes a locking member configured to lock one end side of the piston spring, and a rod-shaped member of which one end side is in contact with the locking member to restrict a length of the piston spring and the other end side is fixed to the piston,
wherein the rod-shaped member is installed in a concave portion provided to open at a central portion of the piston,
wherein the concave portion has a protruding portion configured to protrude toward a radial center of the concave portion,
wherein the piston has a first inner circumferential hole and a second inner circumferential hole both having bottom surfaces on both axial sides of the piston,
wherein the first inner circumferential hole has the bottom surface with which an output shaft of a brake booster is in contact,
wherein an installing portion at which the rod-shaped member is installed is provided in the second inner circumferential hole,
wherein the concave portion is provided in the installing portion,
wherein the protruding portion is formed of the same member as the installing portion, and
wherein a flat portion into which a jig configured to limit rotation of the piston is fitted is provided on an inner circumferential surface of the first inner circumferential hole,
wherein the rod-shaped member has a screw portion provided on the other end side in the axial direction and screwed into the concave portion and a rod-shaped portion provided at a central portion of the rod-shaped member in the axial direction and having an outer diameter larger than the outer diameter of the screw portion,
wherein an opening circumferential edge portion of the opening portion has a convex portion configured to protrude toward the piston spring before the rod-shaped member is screwed into the concave portion,
wherein the protruding portion is a plastically deformed portion of the convex portion that extends toward the radial center of the concave portion when the screw portion of the rod-shaped member is screwed into the concave portion, and
wherein the rod-shaped portion has an end surface which faces the opening portion and has a maximum outer diameter larger than a maximum outer diameter of the convex portion.

9. The master cylinder according to claim 8,
wherein the rod-shaped member has a large-diameter portion provided at one end side of the rod-shaped member in an axial direction to restrict a position of the locking member, and
wherein a polygonal hole is open inside the large-diameter portion.

10. The master cylinder according to claim 9, wherein the protruding portion has an inner diameter smaller than an outer diameter of the screw portion of the rod-shaped member.

11. The master cylinder according to claim 9,
wherein the rod-shaped member has, an extension portion configured to extend from an end surface of the rod-shaped portion on the other end side and having a distal end serving as the screw portion, and an annular recess portion provided in the extension portion between the screw portion and the end surface of the rod-shaped portion, and
wherein the protruding portion is in contact with the end surface of the rod-shaped portion.

12. A master cylinder comprising:
a piston configured to slide in a cylinder body;
a piston spring configured to bias the piston; and
a spring retainer configured to restrict a maximum length of the piston spring,
wherein the spring retainer includes a locking member configured to lock one end side of the piston spring, and a rod-shaped member of which one end side is in contact with the locking member to restrict a length of the piston spring and the other end side is fixed to the piston,
wherein the rod-shaped member is installed in a concave portion provided to open at a central portion of the piston,
wherein the concave portion has a protruding portion configured to protrude toward a radial center of the concave portion,
wherein the rod-shaped member has a large-diameter portion provided at one end side of the rod-shaped member in an axial direction to restrict a position of the locking member, a screw portion provided on the other end side in the axial direction and screwed into the concave portion and a rod-shaped portion provided at a central portion of the rod-shaped member in the axial direction and having an outer diameter larger than the outer diameter of the screw portion, and wherein a polygonal hole is open inside the large-diameter portion, wherein an opening circumferential edge portion of the opening portion has a convex portion configured to protrude toward the piston spring before the rod-shaped member is screwed into the concave portion, wherein the protruding portion is a plastically deformed portion of the convex portion that extends toward the radial center of the concave portion when the screw portion of the rod-shaped member is screwed into the concave portion, and wherein the rod-shaped portion has an end surface which faces the opening portion and has a maximum outer diameter larger than a maximum outer diameter of the convex portion.

13. The master cylinder according to claim 12,
wherein the piston has a first inner circumferential hole and a second inner circumferential hole both having bottom surfaces on both axial sides of the piston,
wherein the first inner circumferential hole has the bottom surface with which an output shaft of a brake booster is in contact,
wherein an installing portion at which the rod-shaped member is installed is provided in the second inner circumferential hole,
wherein the concave portion is provided in the installing portion, and
wherein the protruding portion is formed of the same member as the installing portion.

14. The master cylinder according to claim 13, wherein a flat portion into which a jig configured to limit rotation of the piston is fitted is provided on an inner circumferential surface of the first inner circumferential hole.

15. The master cylinder according to claim 12, wherein the protruding portion has an inner diameter smaller than an outer diameter of the screw portion of the rod-shaped member.

16. The master cylinder according to claim 12,
wherein the rod-shaped member has an extension portion configured to extend from an end surface of the rod-shaped portion on the other end side and having a distal end serving as the screw portion, and an annular recess portion provided in the extension portion between the screw portion and the end surface of the rod-shaped portion, and
wherein the protruding portion is in contact with the end surface of the rod-shaped portion.

* * * * *